United States Patent
Schoen et al.

(10) Patent No.: US 11,772,116 B2
(45) Date of Patent: Oct. 3, 2023

(54) MULTIPLE FOURTH AXIS ROBOT

(71) Applicant: Precision Valve & Automation, Inc., Halfmoon, NY (US)

(72) Inventors: Jason Schoen, Clifton Park, NY (US); Jonathan Urquhart, Saratoga Springs, NY (US); Frank Hart, Rexford, NY (US)

(73) Assignee: PRECISION VALVE & AUTOMATION, INC., Halfmoon, NY (US)

( * ) Notice: Subject to any disclaimer, the term of this patent is extended or adjusted under 35 U.S.C. 154(b) by 0 days.

(21) Appl. No.: 16/697,278

(22) Filed: Nov. 27, 2019

(65) Prior Publication Data
US 2020/0164395 A1    May 28, 2020

Related U.S. Application Data

(60) Provisional application No. 62/772,129, filed on Nov. 28, 2018.

(51) Int. Cl.
*B05B 13/04* (2006.01)
*B25J 15/00* (2006.01)
(Continued)

(52) U.S. Cl.
CPC .......... *B05B 13/0431* (2013.01); *B05B 1/306* (2013.01); *B25J 9/10* (2013.01);
(Continued)

(58) Field of Classification Search
CPC ...... B05B 13/0431; B25J 9/10; B25J 11/0075
See application file for complete search history.

(56) References Cited

U.S. PATENT DOCUMENTS

| 4,679,734 A | 7/1987 | Mommsen et al. |
| 4,798,341 A | 1/1989 | Gimple |

(Continued)

FOREIGN PATENT DOCUMENTS

| CN | 202877038 U | 4/2013 |
| CN | 105521900 A | 4/2016 |

(Continued)

OTHER PUBLICATIONS

Gianos, Gust; "Multi-asix conformal coating machine handles high volume throughput," Consulting-Specifying Engineer Magazine, Published Feb. 16, 2011 (http://www.csemag.com/industry-news/codes-and-standards-updates/single-article/multi-axis-conformal-coating-machine-handles-high-volume-throughput/9568c13c167cefc919aab55fdb2b6862.html); retrieved on Feb. 3, 2017, 2 pages.

(Continued)

*Primary Examiner* — Dah-Wei D. Yuan
*Assistant Examiner* — Stephen A Kitt
(74) *Attorney, Agent, or Firm* — Schmeiser, Olsen & Watts, LLP

(57) ABSTRACT

An end effector is provided that includes a first valve operably connected to a first motor housing, the first valve being moveable along at least four axes, a second valve operably connected to a second motor housing, the second valve being moveable along at least four axes, and a proximity adjustment mechanism configured to adjust a horizontal distance between the first valve and the second valve. An associated conformal coating machine and method are also provided.

9 Claims, 8 Drawing Sheets

(51) Int. Cl.
   *B25J 11/00* (2006.01)
   *B05B 1/30* (2006.01)
   *B25J 9/10* (2006.01)

(52) U.S. Cl.
   CPC ....... *B25J 11/0075* (2013.01); *B25J 15/0019* (2013.01); *B25J 15/0061* (2013.01); *B05B 13/0447* (2013.01)

(56) References Cited

U.S. PATENT DOCUMENTS

| | | | |
|---|---|---|---|
| 4,905,913 | A | 3/1990 | Frikker |
| 5,141,165 | A | 8/1992 | Sharpless et al. |
| 5,163,370 | A * | 11/1992 | Platsch .................. B05B 15/68 |
| | | | 101/424.2 |
| 6,132,809 | A * | 10/2000 | Hynes ................. B05B 13/0431 |
| | | | 118/313 |
| 6,705,537 | B2 | 3/2004 | Schultz et al. |
| 8,230,805 | B2 | 7/2012 | Read |
| 8,765,212 | B2 | 7/2014 | Abernathy et al. |
| 9,374,905 | B2 | 6/2016 | Reid et al. |
| 9,475,077 | B2 | 10/2016 | Christensen |
| 2005/0000416 | A1 | 1/2005 | Prentice et al. |
| 2008/0296311 | A1* | 12/2008 | Read .................. H05K 13/0469 |
| | | | 221/1 |
| 2009/0090795 | A1 | 4/2009 | Ray |
| 2009/0317554 | A1 | 12/2009 | Christensen et al. |
| 2012/0171383 | A1 | 7/2012 | Christensen et al. |
| 2013/0134236 | A1* | 5/2013 | Uematsu ............... B05C 5/0295 |
| | | | 239/536 |
| 2014/0272109 | A1 | 9/2014 | Mrtensson et al. |
| 2016/0008835 | A1 | 1/2016 | Giusti et al. |

FOREIGN PATENT DOCUMENTS

| | | |
|---|---|---|
| CN | 105597981 A | 5/2016 |
| CN | 105766078 A | 7/2016 |
| CN | 105926907 A | 9/2016 |
| CN | 206334813 U | 7/2017 |
| CN | 108097534 A | 6/2018 |
| CN | 108745788 A | 11/2018 |
| DE | 102011112846 A1 | 3/2013 |
| EP | 0796665 B1 | 7/2000 |

OTHER PUBLICATIONS

Nordson Corporation, Nordson ASYMTEK'S Title + Rotate Uses 5 Axes for Fluid Dispensing; Published Jul. 8, 2015 (http://www.nordson.com/en/divisions/asymtek/about-us/news/nordson-asymtek-tilt-rotate-uses-5-axes-for-fluid-dispensing); retrieved on Feb. 3, 2017, 2 pages.

* cited by examiner

MULTIPLE FOURTH AXIS ROBOT

CROSS-REFERENCE TO RELATED APPLICATIONS

This application claims the benefit of and priority to U.S. Provisional Application No. 62/772,129 filed Nov. 28, 2018, and entitled, "Multiple Fourth Axis Robot."

FIELD OF TECHNOLOGY

The following relates to a valve assembly and more specifically to embodiments of a valve assembly having adjustable multiple fourth axis robots with a pitch adjustment.

BACKGROUND

Conformal coating such as acrylic, urethane or silicone, is used to protect the components on a circuit board from moisture, chemicals, dust, and shock. Conformal coating on circuit boards also acts as an insulator for electricity and heat. Some areas of a circuit board cannot be conformally coated in order to preserve the electrical and/or heat conduction because of this insulating property. Accordingly, conformal coating for circuit boards is performed selectively.

SUMMARY

An aspect relates to an end effector comprising a first valve operably connected to a first motor housing, the first valve being moveable along at least four axes, a second valve operably connected to a second motor housing, the second valve being moveable along at least four axes, and a proximity adjustment mechanism configured to adjust a horizontal distance between the first valve and the second valve.

In an exemplary embodiment, the first valve and the second valve are configured to tilt with respect to first motor housing and the second motor housing, respectively.

In an exemplary embodiment, the proximity adjustment mechanism comprises a base plate connected to the end effector frame and a slider that is slidable along the base plate. The second motor housing is fixedly attached to the base plate, and the slider is slidably attached to the base plate and fixedly attached to the first motor housing. The slider slides across a track on the base plate to reduce the horizontal distance between the first valve and the second valve.

In an exemplary embodiment, the proximity adjustment mechanism further comprises third motor housing having a motor that turns a gear that engages with the track such that as the gear turns, the slider slides along the track of the base plate. The track comprises teeth that engage with the gear turned by the motor housed in the third motor housing.

In an exemplary embodiment, the first valve is connected to a support plate of the first motor housing that extends below a base plate of the end effector, and the second valve is connected to a support plate of the second motor housing that extends below the base plate of the end effector.

In an exemplary embodiment, a movement of the first valve, the second valve, and the proximity adjustment mechanism is computer programmable.

An aspect relates to a conformal coating machine comprising an end effector attached to a robot configured to allow movement of the end effector along at least three axes. The end effector comprises a first valve operably connected to a first motor housing, the first valve being moveable along at least four axes, a second valve operably connected to a second motor housing, the second valve being moveable along at least four axes, and a proximity adjustment mechanism configured to adjust a horizontal distance between the first valve and the second valve.

An aspect relates to a method of coating components, comprising adjusting a horizontal distance between a first valve and a second valve of a conformal coating machine.

In an exemplary embodiment, adjusting the horizontal distance includes at least one of: moving the first valve toward and away from the second valve, and moving the second valve toward and away from the first valve. Moving the first valve includes sliding a slider laterally across a track of a base plate connected to at least the second valve.

In an exemplary embodiment, the horizontal distance is adjusted without needing to move an end effector attached to a robot of the conformal coating machine.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

To accomplish selective conformal coating, requiring very precise applications, robotic dispensing systems have been employed. Such systems heretofore have provided relatively precise dispensing of conformal coating on small circuit board components, as well as the ability to spray conformal coating across larger areas of a circuit board. Where components are located on a conveyer or other location for conformal coating, it can be difficult to efficiently coat the components without moving an entire end effector of a robotic dispensing system, particularly where components are different sizes or dimensions. Further difficulty can arise when it is necessary to move an entire end effector to fully coat a single component. Moreover, where multiple valves are used, even where the valves are moveable, a static distance between the valves can prevent precise and efficient coating of a component, for example, where the valves are being used to coat components of various sizes.

Thus, a need exists for an improved valve assembly and methods thereof.

Figure 1:
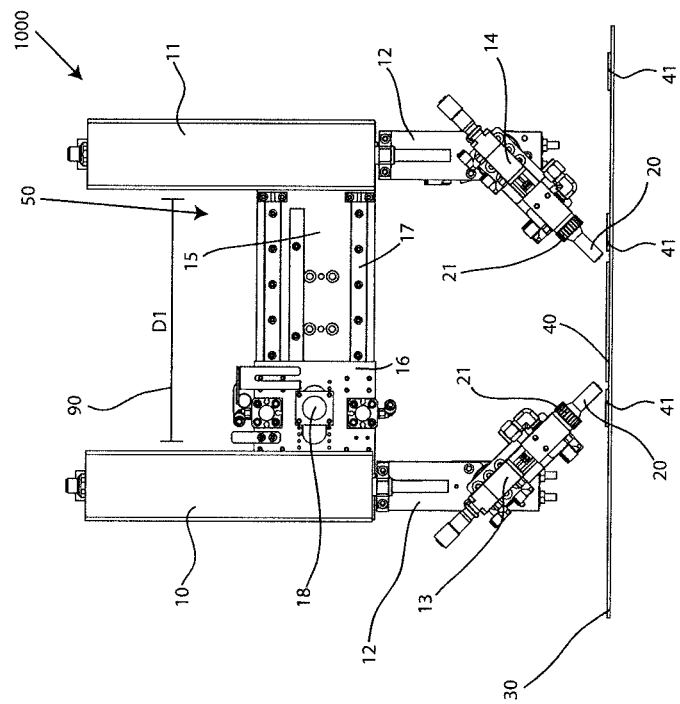
FIG. 1 depicts a front view of an end effector having a first valve and a second valve in a first valve position, in accordance with embodiments of the present invention.

Referring to the drawings, FIG. 1 depicts a front view of an end effector 1000. End effector 1000 may be a fluid dispensing assembly, a valve assembly, an adhesive dispensing assembly, a coating assembly, a coating valve assembly, a conformal coating assembly, a conformal coating valve assembly, a coating applicator, an adhesive dispenser, a multiple axis robot, a four-axis programmable valve assembly, and the like. Embodiments of the end effector 1000 may also refer to any device(s) attached to a X, Y, Z or other axis of movement to perform a variety of tasks, such as dispensing, coating, etc. Shown in FIG. 1, the end effector 1000 is positioned above components 40, 41 on a platform 30. Platform 30 may be a work piece, a substrate, a conveyor, a platform, a support plate within an enclosed machine, a stationary surface, and the like. Components 40, 41 may be various sizes. For example, component 40 is larger than components 41. Components 40, 41 may be an electrical component such as a circuit board component, electrical component attached to the circuit board, and the like. In embodiments where the platform 30 is a conveyor, the conveyor may be used to move a work piece or object through a conformal coating system and along to another station in a production process. Further, the components 40, 41 may also be placed on a stationary surface for coating by the end effector 1000.

Embodiments of the end effector 1000 comprise a first motor housing 10 and a second motor housing 11. Embodiments of the first motor housing 10 and the second motor housing 11 are each moveably attached to a single base plate 15. For example, the first motor housing 10 are moveably attached, affixed, fastened, or otherwise coupled to a first end of the base plate 15, and the second motor housing 11 is moveably attached, affixed, fastened, or otherwise coupled to a first end of the base plate 15. One of the first motor housing 10 and the second motor housing can be attached to a slider 16, which is moveably attached to the base plate 15. The first motor housing 10 and the second motor housing 11 may be directly attached to a gantry robot via base plate 15 and/or slider 16. The end effector 1000 utilizes a robot or robotic platform to perform automated tasks with accuracy, precision, and repeatability. As an example, the end effector 1000 may also be connected to any robotic manipulator such as a selective compliant assembly robot arm (SCARA) system, linear robot, multi-axis robot arm system, and the like. End effector 1000 has at least three axes of movement, for example, X axis, Y axis, and Z axis. A θ (theta) axis represents an axis about which the valves 13, 14 can tilt with respect to the support plates 12. The end effector 1000 comprises one or more actuators that cause the movement of the end effector 1000 along any axis. For example, the end effector 1000 includes an X axis actuator, a Y axis actuator, and a Z axis actuator, and a θ axis actuator. As an example, the θ axis actuator may comprise a brushless servo motor. As an example, an X-axis actuator, Y-axis actuator, and Z-axis actuator may be a ball screw slide, linear motion slide, a linear actuator, and the like. End effector 1000 can move left and right along the Y axis, back and forth along the X axis, and up and down along the Z axis.

Embodiments of the first motor housing 10 and the second motor housing 11 each house a motor (not shown), such as a servo motor. The first motor housing 10 and the second motor housing 11 each include an electrical connection interface 60 (e.g. electrical plug or connectors) by which a motor such as a servo motor may be connected to an electrical power source. Each motor may be configured to effectuate the movement of a valve connected to the respective first motor housing 10 and second motor housing 11. End effector 1000 may comprise one or more zero backlash couplings for preventing sudden starts and stops of the motors housed by the first motor housing 10 and the second motor housing 11.

In one embodiment, for example, as shown in FIG. 1, a support plate 12 is rotatably attached to the first motor housing 10. A first valve body 13 is attached to the support plate 12 on the first motor housing 10. The support plate 12 is also rotatably attached to the second motor housing 11. A second valve body 14 is attached to the support plate 12 on the second motor housing 11. The first valve body 13 and the second valve body 14 may be valves, valves enclosed in valve housing, and the like. Movement of the first valve body 13 is effectuated by a motor such as a servo motor housed in the first motor housing 10. Movement of the second valve body 14 is effectuated by a motor such as a servo motor housed in the second motor housing 11. The first valve body 13 and the second valve body 14 each include a coating applicator 20 configured to apply a protective coating such as conformal coating on the components 40, 41, or an adhesive applied to the components 40, 41 or other target substrates, such as glass sheets. The coating applicators 20 may comprise various nozzle types depending on the coating to be applied. For instance, the coating applicator 20 may have a dispensing valve, a spray valve, an atomizing spray tip, and the like. A dispensing valve, which may also be referred to as a "needle valve" is a pneumatically actuated valve that dispenses conformal coating through an interchangeable needle orifice. A spray valve is a pneumatically activated valve that combines conformal coating with pressurized air to dispense an atomized spray pattern, for example, a round spray pattern. An atomizing spray tip may be used to controllably atomize a fluid being dispensed by the valve bodies 13, 14. The coating applicator 20 may be the same or may be different between the first valve 13 and the second valve 14. For example, the first valve body 13 may have a coating applicator 20 comprising a dispensing valve, and the second valve body 14 may have a coating applicator 20 comprising a spray valve. Each of the coating applicators 20 may be the same. As another example, each of the coating applicators 20 may comprise a nozzle, an outlet, a spigot, a tap, and the like. For example, a coating applicator 20 may comprise a flat fan nozzle, a hollow cone nozzle, a full cone nozzle, a misting nozzle, a solid stream nozzle, an atomizing nozzle, or any other kind of nozzle. A coating applicator 20 may comprise a nozzle that dispenses conformal coating in any shape or pattern. Coating applicators 20 may comprise or be configured to receive a custom head or valve assembly for different protective coating application requirements. The coating applicators 20 may be comprised of a metal, such as stainless steel, or a combination of metal and composite materials, plastics, etc. A fluid reservoir may be operably attached to one or each of the coating applicators 20 through various means, such as a hose, line, conduit, or other tube. The coating applicators 20 may include a single dispensing or spray or other type of valve or a plurality of valves for dispensing adhesive, conformal coating, or other protective coating. The coating applicators 20 may include a retainer 21 to threadably attach an air cap to the valve body.

Embodiments of the first valve body 13 and the second valve body 14 are each capable of movement along at least four axes of movement. Movement of the first valve body 13 and the second valve body 14 occurs during movement of the end effector along the X axis, Y axis, or Z axis. The first valve body 13 and the second valve body 14 are each rotatably disposed on the support plate 12 that is rotatably attached to the first motor housing 10 and second motor housing 11, respectively. The support plates 12 are configured to move independently of the end effector 1000 and of each other. The first valve body 13 and its corresponding support plate 12 is configured such that first valve body 13 has at least four axes of movement: X axis, Y axis, Z axis, rotation of support plate 12 with respect to motor housing 10, and tilting about the θ axis. For example, the first valve body 13 may be configured to move up and down a Z axis. The first valve body may be configured to move back and forth on an X axis, and left and right on a Y axis. Likewise, the second valve body 14 and its corresponding support plate 12 are configured such that second valve body 14 has at least four axes of movement: X axis, Y axis, Z axis, rotation of support plate 12 with respect to motor housing 11, and tilting about the θ axis. For example, the second valve body 14 may be configured to move up and down a Z axis. The second valve body 14 may be configured to move back and forth on an X axis, and left and right on a Y axis. The first valve body 13 and the second valve body 14 are configured to simultaneously and/or independently move along a different axis. For example, the first valve body 13 may rotate about the θ axis while the second valve body is not rotating about the θ axis.

In addition to the axes of movement comprising the X axis, Y axis, and Z axis, the first valve body 13 and the second valve body 14 are configured to tilt at an angle with respect to the Z axis, about the theta axis. For example, the first valve body 13 and the second valve body 14 each have a pneumatic tilt axis. With reference to FIG. 1, first valve body 13 and second valve body 14 are each shown in a first valve position in which the first valve body 13 and the second valve body 14 are each tilted 45° with respect to the Z axis towards one another. Tilt of the first valve body 13 and the second valve body 14 effectuates an adjustment of distance between the coating applicators 20 and thereby permit the coating applicators 20 to apply conformal coating more efficiently such that the coating applicators 20 are not both applying coating to the same location on a component 40, 41.

Figure 2:
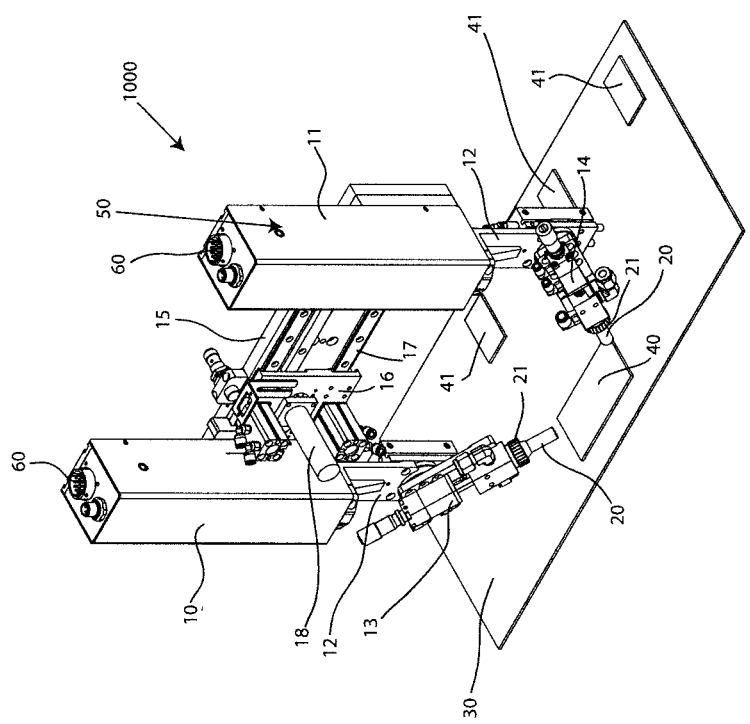
FIG. 2 depicts a front, perspective view of the end effector of FIG. 1, in accordance with embodiments of the present invention.

FIG. 2 depicts a front, perspective view of the end effector 1000 of FIG. 1 in the first valve position, in accordance with embodiments of the present invention. In the first valve position, the first valve body 13 and the second valve body 14 tilt 45° towards one another, which positions the coating applicators 20 in proximity to opposite ends of component 40. First valve body 13 and second valve body 14 are not limited to having a tilt of 45° and may, for example, be configured to tilt up to 90° with respect to the Z axis. The first valve body 13 and the second valve body 14 are configured to tilt to any degree with respect to the Z axis at any point about the θ axis. Any combination of rotation about the θ axis and tilt degree with respect to the Z axis of the first valve body 13 and the second valve body 14 is achievable.

Figure 3:
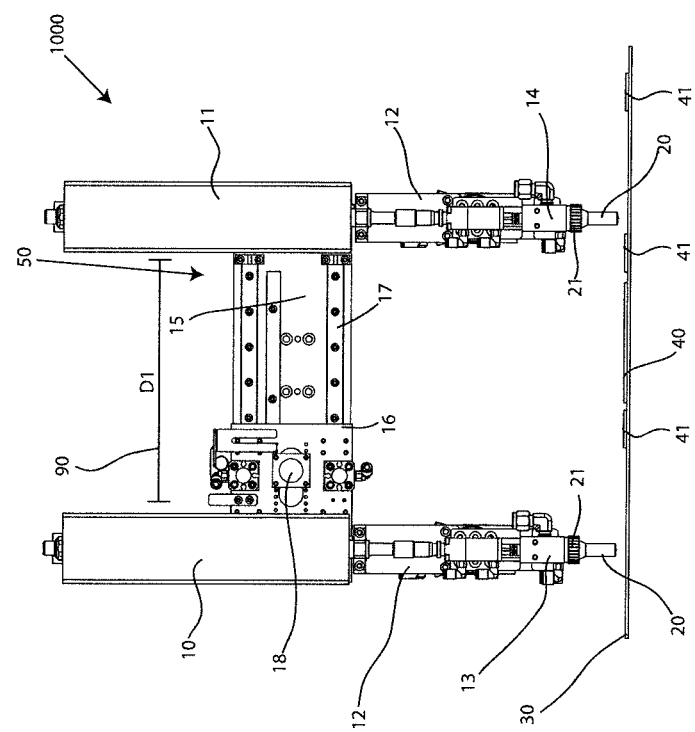
FIG. 3 depicts a front view of an end effector having a first valve and a second valve in a second valve position, in accordance with embodiments of the present invention.

FIG. 3 depicts a front view of the end effector 1000 in a second valve position, in accordance with embodiments of the present invention is shown. In this second position, the first valve body 13 and the second valve body 14 are each pointing downwards parallel to one another. The first valve body 13 and the second valve body 14 are not limited to having the same tilt at any given time. For example, the first valve body 13 may have a 20° tilt while the second valve body 14 is pointing straight down. Each of the first valve body 13 and the second valve body 14 may have continuously changing degrees of tilt, for example, as the first valve body 13 and second valve body 14 move about a component 40, 41 to coat the component 40, 41. Various movement and tilt of the valve bodies 13, 14 are computer programmable.

Figure 4:
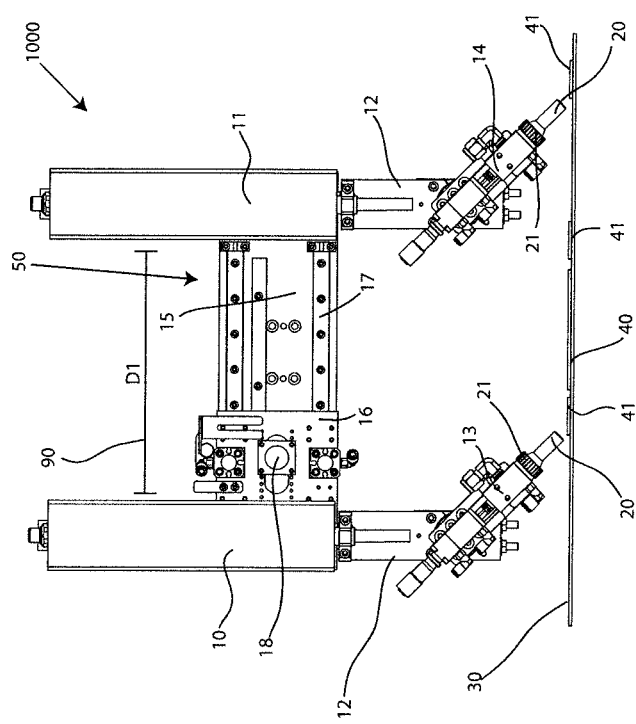
FIG. 4 depicts a front view of an end effector having a first valve and a second valve in a third valve position, in accordance with embodiments of the present invention.

First valve body 13 and second valve body 14 may also tilt in the same direction. FIG. 4 depicts a front view of the end effector 100 in a third valve position, in accordance with embodiments of the present invention. In the third valve position, the first valve body 13 and the second valve body 14 are both tilting at 45° angles in a rightward direction in relation to the conveyor 30. First valve body 13 and second valve body 14 could also tilt at any degree in any other direction. For example, first valve body 13 and second valve body 14 may each tilt 45° and be pointing in a leftward direction in relation to the conveyor 30.

Figure 5:
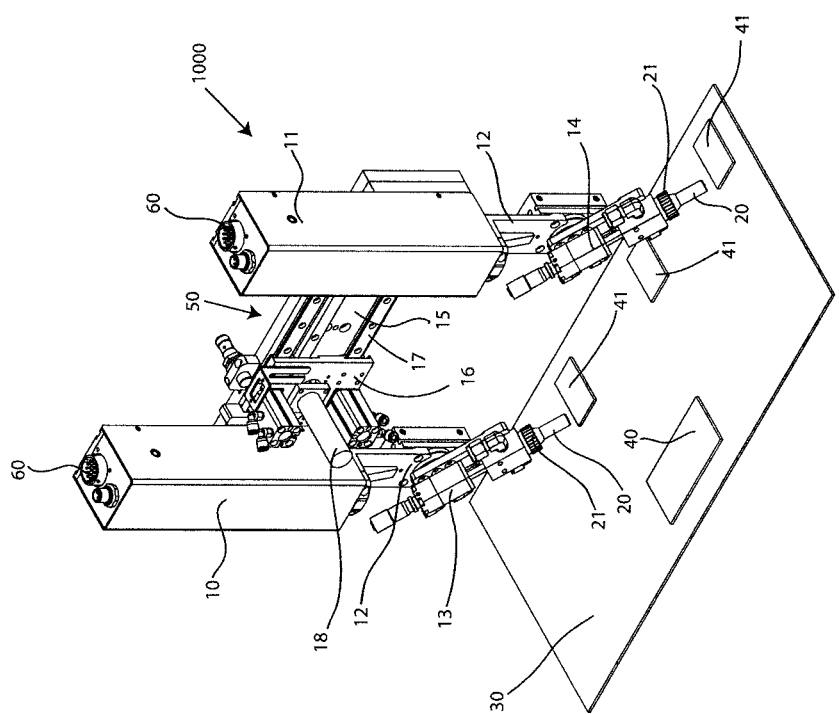
FIG. 5 depicts a front, perspective view of the end effector of FIG. 4, in accordance with embodiments of the present invention.

FIG. 5 depicts a front, perspective view of the end effector 1000 of FIG. 4 in accordance with embodiments of the present invention is shown. Different positions of the first valve body 13 and the second valve body 14 facilitate the coating of different sized components 40, 41, facilitate the coating of components 40, 41 having different orientations, and facilitate coating of the components 40, 41 at different speeds. For example, the first valve body 13 and the second valve body 14 are shown in FIG. 5 in a third valve position in which each coating applicator 20 is positioned proximate to a different smaller component 41. The first valve body 13 and the second valve body 14 are positioned to each apply coating to the same component 40 at the same time. In other position, the first valve body 13 and the second valve body 14 may be positioned to each apply coating to different components 40, 41.

Each of the first valve body 13 and the second valve body 14 are configured to move independently of one another when the support plates 12 are independently rotated and/or when the first valve body 13 or the second valve body 14 is being tilted. This may be particularly advantageous for conformally coating a component 40, 41 quickly and uniformly without requiring movement of the entire end effector 1000 attached to a robotic platform. For example, the first valve body 13 may be used to spray conformal coating underneath or on the sides component 40, 41, and the second valve body 14 may be used to spray conformal coating on the top of component 40, 41. In an instance where components 40, 41 are moving on a conveyor 30, the components 40, 41 may first pass underneath the coating applicator 20 of the second valve body 14. The second valve body 14 may be in a straight vertical position as shown in FIG. 3. As the components 40, 41 approach the second valve body 14, second valve body 14 may tilt 45° toward components 40, 41 and spray coating thereon as shown in FIG. 4. As shown in FIGS. 1 and 2, with respect to a larger component 40, for example, as component 40 moves along the conveyor, the second valve body 14 may tilt 45° in the opposite direction as shown in FIGS. 1 and 2, thereby spraying the entirety of the top and sides of component. First valve body 13 may also initially be in a straight vertical position as shown in FIG. 3, and then tilt 45° to the right as shown in FIG. 4 as the component 40 approaches the first valve body 13. As the component 40 moves along the conveyor, the first valve body may tilt 45° in the opposite direction thereby spraying the entirety of the bottom of the component 40. As another example, as the component 40 moves along the conveyor, the first valve body 13 may rotate by the rotation of the support plate 12 to which the first valve body 13 is attached. While rotating, both valve bodies 13, 14 may also move up or down along the Z axis, which may be advantageous when a component 40, 41 is irregularly shaped or has varying heights at different parts of the component 40, 41 or if successive components along the platform 30 have a different height.

End effector 1000 further comprises a proximity adjustment mechanism 50. The proximity adjustment mechanism 50 is configured to adjust a horizontal distance 90 between the first motor housing 10 and the second motor housing 11. When the proximity adjustment mechanism 50 increases the distance 90 between the first motor housing 10 and the second motor housing 11, the distance between the first valve body 13 and the second valve body 14 likewise increases. Similarly, when the proximity adjustment mechanism 50 reduces the distance 90 between the first motor housing 10 and the second motor housing 11, the distance between the first valve body 13 and the second valve body 14 is likewise reduced.

In an exemplary embodiment, the proximity adjustment mechanism 50 comprises a base plate 15 and a slider 16. The base plate 15 extends between the first motor housing 10 and the second motor housing 11. The base plate 15 may comprise one or more layers or material. The second motor housing 11 is attached to the base plate 15. The slider 16 is shown attached to the first motor housing 10 such that movement of the slider 16 translates to movement of the first motor housing 10. However, in other embodiments, the slider is attached to the second motor housing 11 such that that movement of the slider 16 translates to movement of the second motor housing 11. The slider 16 may be a programmable sliding plate member having a structure that cooperates with corresponding structure of the base plate 15 or components attached to the base plate 15 specifically for engaging and cooperating with the slide 16. The slider 16 slidably interfaces with the base plate 15 such that the slider 16 slides or otherwise moves back and forth on the base plate 15. For example, the first motor housing 10 may be a first distance D1 from the second motor housing 11, as shown for example in FIGS. 1, 3, and 4.

Figure 6:
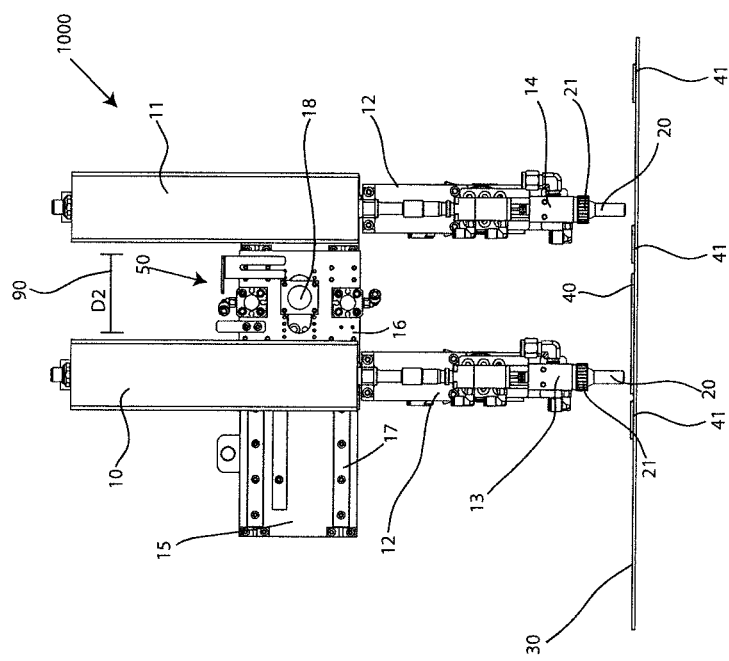
FIG. 6 depicts a front view of an end effector, in which a distance between the first valve and the second valve has been adjusted, in accordance with embodiments of the present invention.

FIG. 6 depicts a front view of the end effector 1000 in which a distance 90 between the first valve body 13 and the second valve body 14 has been adjusted, in accordance with embodiments of the present invention. The slider 16 is configured to slide or otherwise move along the base plate 15 towards the second motor housing 11 such that the first motor housing 10 moves from a first distance D1 away from the second motor housing 11 to a second, closer, distance D2 from the second motor housing 11, as shown in FIG. 6. Accordingly, as the slider 16 moves along the base plate 15 towards the second motor housing 11, the first valve body 13 becomes closer to the second valve body 14. The distance between the first valve body 13 and the second valve body 14 dictates or otherwise influences a manner in which the components are coated.

Sliding of the slider 16 along the base plate 15 is effectuated by one or more tracks 17 located along and disposed on the base plate 15. The tracks 17 are either formed into the material of the base plate 15, or are separate parts that are attached to the base plate 15. The slider 16 engages the track 17 and slides back and forth horizontally along the base plate 15, thereby causing the distance between the first motor housing 10 and the second motor housing 11 to be expanded or retracted depending on the direction of movement of the slider 16.

The proximity adjustment mechanism 50 further comprises a linear actuator system to effectuate horizontal movement of the slider 16 along the base plate 15. For example, the proximity adjustment mechanism 50 includes a motor (not shown) such as a servo motor which may be housed in a third motor housing 18. The motor in the third motor housing 18 may turn a gear that engages with the track 17 such that as the gear turns, the slider 16 slides along the track 17 of the base plate 15. The track 17 may comprise teeth, ridges, grooves, edges, divots, notches, or the like that engage with a gear turned by the motor housed in the third motor housing 18. As an example, the first motor housing 10 may be in a first position that is the farthest distance away from the second motor housing 11, as shown in FIGS. 1-5. A servomotor in the third motor housing 18 may then turn a gear engaged with teeth in the track 17 such that the slider 16 slides along the track 17 towards the second housing member 11, such that the distance between the first housing member 10, and the second housing member 11 decreases, and the distance between the first valve body 13 and the second valve body 14 decreases. The servo motor may turn the gear until the slider 16 abuts the second motor housing 11, as shown in FIG. 6.

Figure 7:
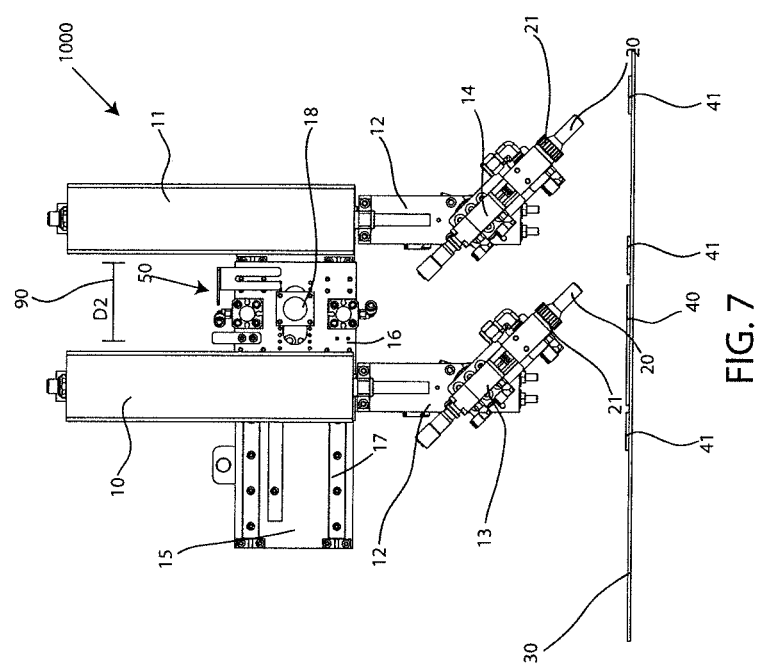
FIG. 7 depicts a front view of an end effector, in which a distance between the first valve and the second valve has been adjusted, in an alternate valve position, in accordance with embodiments of the present invention.

FIG. 7 depicts a front view of the end effector 1000 in which a distance between the first valve body 13 and the second valve body 14 has been adjusted, in an alternative valve position in accordance with embodiments of the present invention. The first valve body 13 and the second valve body 14 can each independently move along any of the X axis, Y axis, Z axis, or θ axis and can simultaneously tilt to any degree contemporaneously with the adjustment of the distance between the first motor housing 10 and the second motor housing, as well as the movement of the end effector 1000 along any of the X axis, Y axis, Z axis, or θ axis. By way of example, in the alternative valve position, the first valve body 13 and the second valve body 14 are each now tilting 45° to the right with respect to the end effector 1000 shown in FIG. 6. However, the first valve body 13 and the second valve body 14 can also be tilted 45° towards one another from the position shown in FIG. 6 by programming the first valve body 13 to tilt to the right and programming the second valve body 14 to tilt to the left.

Further, the horizontal distance between the first motor housing 10 and the second motor is controlled by the programmed movement of the slider 16. By way of example, if the slider 16 is programmed to move along the track 17 towards the second motor housing 11 from the position of the end effector 1000 shown in FIG. 1, a first distance D1 away from the second motor housing 11 is reduced to a second distance D2 away from the second motor housing 11, as depicted in FIGS. 6 and 7. Contemporaneously with this lateral movement of the first housing member 10, the first valve body 13 and the second valve body 14 also move. Further, only one of the first valve body 13 and the second valve body 14 may move depending on which housing the slider 16 is mechanically attached to.

Additionally, contemporaneously with the lateral movement of the first motor housing 10 toward the second motor housing 11 from the first distance D1 shown in FIG. 1 to the second distance D2 shown in FIG. 7, the second valve body 14 may tilt from the left to the right such that when the slider 16 reaches and abuts the second motor housing 11 and the first motor housing is a second, closer distance D2 to the first motor housing 10, the second valve body 14 is tilted 45° to the right such that the first valve body 13 and the second valve body 14 are both tilting 45° in the same direction as shown in FIG. 7. It should be understood that the proximity adjustment mechanism 50 is not limited to adjusting the distance between the first motor housing 10 and the second motor housing 11 from a distance in which the first motor housing 10 and the second motor housing 11 are the farthest distance away to a distance in which the slider 16 abuts the second motor housing 11. For example, the proximity adjustment mechanism 50 may move the first motor housing 10 any distance towards or away from the second motor housing 11 to accommodate various arrangements of components on a PCB or platform 30, for example. The track 17 may have one or more equidistant intervals, markings, notches, and the like based on a desired distance of lateral movement. The proximity adjustment mechanism 50 may be configured to move the first motor housing 10 by such intervals.

Figure 8:
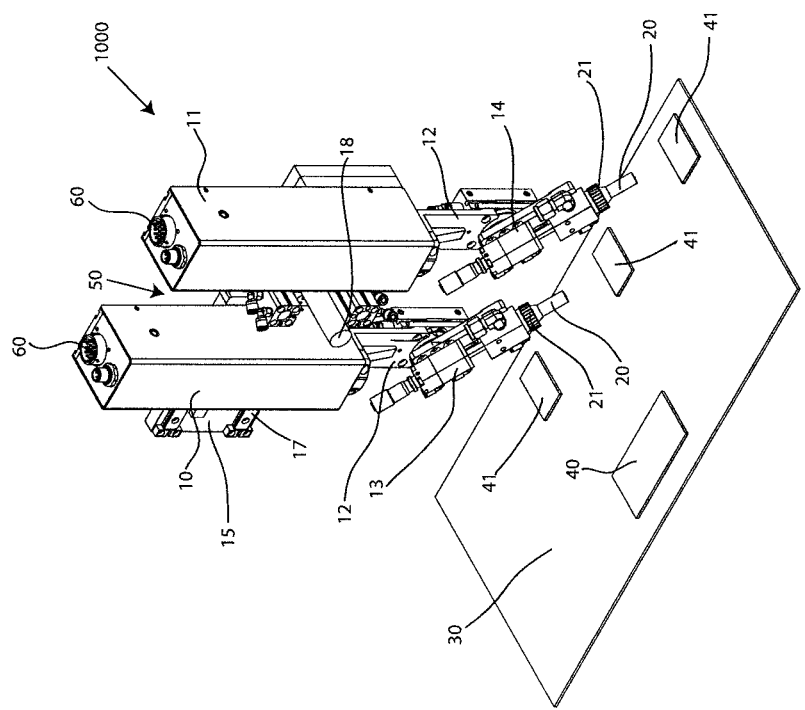
FIG. 8 depicts a front, perspective view of the end effector of FIG. 7, in accordance with embodiments of the present invention.

FIG. 8 depicts a front, perspective view of the end effector 1000 of FIG. 7 in accordance with embodiments of the present invention. The first valve body 13 and the second valve body 14 are positioned such that the coating applicators 20 are each proximate to a different smaller component 41. Lateral movement of the first housing body 10 effectuated by the proximity adjustment mechanism 50 and contemporaneous independent movement of the first valve body 13 and the second valve body 14 may effectuate more thorough coating application by permitting a valve body to be used to ensure no components 40, 41 have areas that were not coated. By way of example, the second valve body 14 applies coating to a component 41, and as the component 41 moves past the second valve body 14 along a conveyor, the first valve body 13 moves laterally towards the second valve body 14 to quickly apply coating to any areas of the component 41 that may have been missed by the coating performed by the second valve body 14. The first valve body 13 may be positioned a distance away from the second valve body 14 as shown in FIG. 5, and then move towards the second valve body 14 as shown in FIG. 8.

Contemporaneous adjustment of the distance between the first motor housing 10 and the second motor housing 11 and movement of the first valve body 13 and the second valve body 14 permits the end effector 1000 to be used for various different coating application requirements, on different types, arrangements, dimensions, and proportions of components 40, 41 without needing program additional movement of the end effector 1000 or replace a current end effector with a different end effector (e.g. smaller/larger) for coating different types of components 40, 41. This may also permit the speed with which components are coated to be increased by reducing the need to pause conveyance of components 40, 41 during the coating process.

The proximity adjustment mechanism 50 is not limited to moving the first motor housing 10 via a servo motor and track 17 and a gear; other embodiments are contemplated. For example, the proximity adjustment mechanism 50 may be configured to execute horizontal or lateral movement of the first motor housing 10 towards and away from the second motor housing 11 via a gear and gear rack. As another example, the proximity adjustment mechanism 50 may comprise a rack and pinion configured to effectuate horizontal movement of the first motor housing 10 towards and away from the second motor housing 11. As yet another example, the proximity adjustment mechanism 50 may comprise a roller-pinion system comprising a rack and a pinion having rollers that engage with the rack. As another example, the proximity adjustment mechanism 50 may comprise a scotch yoke mechanism configured to effectuate the movement of the programmable sliding plate member 16 towards the second motor housing 11.

Embodiments of the proximity adjustment mechanism 50 are also not limited to comprising a base plate 15 and a slider 16. For example, the proximity adjustment mechanism 50 may comprise a telescoping member that may extend or retract to move the first motor housing 10 closer to the second motor housing 11. As an example, the first motor housing 10 may be attached to one end of a telescoping member portion configured to retract into a larger telescoping member portion. The second motor housing 11 may be attached to the larger telescoping member portion. The telescoping member may telescope to extend and retract by a motor, pneumatically, hydraulically or the like. As another example, the proximity adjustment mechanism 50 may comprise a roller screw for adjusting the distance between the first motor housing 10 and the second motor housing 11.

Adjustment of the proximity of the first motor housing 10 with respect to the second motor housing 11 may be advantageous to increase the efficiency of coating multiple components 40, 41 consecutively in a faster manner. For example, if a component 40, 41 is positioned underneath the first valve body 13 and the coating applicator 20 of the first valve body 13 commences a coating application of the component 40, a conveyor belt may continue to move the component along while the component is being coated 40, 41, as the first valve body 13 moves closer to the second valve body 14 while it is applying material onto the component by the slider 16 moving the first motor housing 10 along the base plate 15 towards the second motor housing 11. The second valve body 14 may be configured to apply coating underneath the component 40, 41. By the time the component is moved to be underneath the second valve body 14, the first valve body 13 may have completed a top and sides coating application on the component 40 while the component 40 was moving along the conveyor. Once the first valve body 13 has completed the top and sides coating of the component 40, 41, the first valve body can be efficiently moved back to a starting position for example as shown in FIG. 1, by the slider 16 sliding the first motor housing 10 away from the second motor housing 11.

As another example, adjustment of the proximity of the first motor housing 10 and the second motor housing 11 may also be advantageous where components 40 that need to be coated vary in size or dimensions. For example, the proximity adjustment mechanism 50 may effectuate the coating of components 40, 41 having various dimensions. For example, the first valve body 13 may be moved farther away from the second valve body 14 by sliding the slider 16 along the base plate 15 away from the second motor housing 11 such that the first valve body 13 and the second valve body 14 are farther apart and can be positioned at opposite ends, sides, or other dimensions of a component 40, as shown for example in FIGS. 1 and 2. As another example, the first valve body 13 and the second valve body 14 may be moved closer together for the coating of a smaller component 41, for example, as shown in FIGS. 5 and 8.

A frame may enclose, house, or otherwise receive the end effector 1000 (and potentially other end effectors) and may provide a structure surrounding the end effector 1000. The frame may allow for panels to be attached providing an enclosure for the end effector 1000. The panels attached to the frame may be a combination of both solid panels and see-through panels, such as Plexiglas®, glass, plastic, and the like, to allow viewing of the operation of the end effector 1000 and/or satisfy necessary safety precautions during operation of the conformal coating machine.

With reference to FIGS. 1-8, associated methods of coating components will now be described.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. An end effector comprising:
   a first valve rotatably attached to a first support plate that is rotatably attached to a first motor housing, wherein the first valve is rotatable with respect to the first support plate about a first axis, and the first support plate is rotatable with respect to the first motor housing about a second axis;
   a second valve rotatably attached to a second support plate that is rotatably attached to a second motor housing, wherein the second valve is rotatable with respect to the second support plate about a third axis, and the second support plate is rotatable with respect to the second motor housing about a fourth axis; and
   a proximity adjustment mechanism configured to adjust a horizontal distance between the first valve and the second valve, the proximity adjustment mechanism comprising:
      a base plate fixedly attached to the second motor housing, and
      a slider that is fixedly attached to the first motor housing and configured to slide back and forth horizontally along the base plate;
   wherein the first valve and the second valve are tiltable with respect to the proximity adjustment mechanism via rotation about the first axis and the third axis, respectively;
   wherein the first support plate is capable of rotating about the second axis independently from a rotation of the second support plate about the fourth axis;
   wherein the end effector is configured to be attached to a robot having an X axis actuator for movement along an X axis, a Y axis actuator for movement along a Y axis, and a Z axis actuator for movement along a Z axis, and the first support plate and the second support plate are capable of moving independently of a movement of the end effector;
   wherein the first valve and the second valve are each capable of moving in at least four axes, including left and right movement of the end effector along the X axis, backward and forward movement of the end effector along the Y axis, up and down movement of the end effector along the Z axis, titling, and rotation about the second axis and the fourth axis, respectively.

2. The end effector of claim 1, wherein the first valve and the second valve are configured to tilt with respect to first motor housing and the second motor housing, respectively.

3. The end effector of claim 1, wherein the slider slides across a track on the base plate to reduce the horizontal distance between the first valve and the second valve.

4. The end effector of claim 3, wherein the proximity adjustment mechanism further comprises third motor housing having a motor that turns a gear that engages with the track such that as the gear turns, the slider slides along the track of the base plate.

5. The end effector of claim 4, wherein the track comprises teeth that engage with the gear turned by the motor housed in the third motor housing.

6. The end effector of claim 1, wherein the first support plate extends below the first motor housing and the second support plate extends below the second motor housing.

7. The end effector of claim 1, wherein a movement of the first valve, the second valve, and the proximity adjustment mechanism is computer programmable.

8. A conformal coating machine comprising:
   an end effector attached to a robot configured to allow movement of the end effector along at least three axes;
   wherein the end effector comprises:
   a first valve rotatably attached to a first support plate that is rotatably attached to a first motor housing, wherein the first valve is rotatable with respect to the first support plate about a first axis, and the first support plate is rotatable with respect to the first motor housing about a second axis;
   a second valve rotatably attached to a second support plate that is rotatably attached to a second motor housing, wherein the second valve is rotatable with respect to the second support plate about a third axis, and the second support plate is rotatable with respect to the second motor housing about a fourth axis; and
   a proximity adjustment mechanism configured to adjust a horizontal distance between the first valve and the second valve, the proximity adjustment mechanism comprising:
      a base plate fixedly attached to the second motor housing, and
      a slider that is fixedly attached to the first motor housing and configured to slide back and forth horizontally along the base plate;
   wherein the first valve and the second valve are tiltable with respect to the proximity adjustment mechanism via rotation about the first axis and the third axis, respectively;
   wherein the first support plate is capable of rotating about the second axis independently from a rotation of the second support plate about the fourth axis;
   wherein the end effector is configured to be attached to the robot having an X axis actuator for movement along an X axis, a Y axis actuator for movement along a Y axis, and a Z axis actuator for movement along a Z axis, and the first support plate and the second support plate are capable of moving independently of the movement of the end effector;

wherein the first valve and the second valve are each capable of moving in at least four axes, including left and right movement of the end effector along the X axis, backward and forward movement of the end effector along the Y axis, up and down movement of the end effector along the Z axis, titling, and rotation.

9. The conformal coating machine of claim 8, wherein the first support plate extends below the first motor housing and the second support plate extends below the second motor housing.

* * * * *